(12) United States Patent
Tsumiyama et al.

(10) Patent No.: US 8,556,331 B2
(45) Date of Patent: Oct. 15, 2013

(54) UTILITY VEHICLE

(75) Inventors: Yoshinori Tsumiyama, Lincoln, NE (US); Hidetoshi Kaku, Lincoln, NE (US); Chad Enger, Lincoln, NE (US); Kazuhiro Maeda, Akashi (JP); Naoki Hashimoto, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 340 days.

(21) Appl. No.: 12/980,229

(22) Filed: Dec. 28, 2010

(65) Prior Publication Data

US 2012/0161468 A1    Jun. 28, 2012

(51) Int. Cl.
*B60J 5/04* (2006.01)

(52) U.S. Cl.
USPC ..................................... 296/146.5

(58) Field of Classification Search
USPC ........... 296/146.5, 146.7, 146.11, 146.6, 191, 296/190.11; 49/502
See application file for complete search history.

(56) References Cited

U.S. PATENT DOCUMENTS

| | | | |
|---|---|---|---|
| 6,923,492 B2 * | 8/2005 | Okazaki et al. ............ | 296/146.6 |
| 7,117,639 B2 * | 10/2006 | Abdella et al. ............ | 49/382 |
| 2010/0019533 A1 * | 1/2010 | Kinoshita et al. ........... | 296/146.6 |
| 2011/0062748 A1 * | 3/2011 | Kaita et al. ................ | 296/146.9 |
| 2011/0156438 A1 * | 6/2011 | Ichihara et al. ............ | 296/181.1 |

FOREIGN PATENT DOCUMENTS

| | | | | |
|---|---|---|---|---|
| DE | 1728539 | * | 3/1976 | |
| EP | 802288 A2 | * | 10/1997 | ............... E05B 1/00 |
| JP | 58078838 A | * | 5/1983 | ............... B60R 7/04 |
| JP | 2004119916 A | * | 4/2004 | ............... H05K 5/03 |
| JP | 2009-243189 A | | 10/2009 | |

* cited by examiner

*Primary Examiner* — Glenn Dayoan
*Assistant Examiner* — Pinel Romain
(74) *Attorney, Agent, or Firm* — Alleman Hall McCoy Russell & Tuttle LLP

(57) ABSTRACT

A utility vehicle includes a vehicle body; a seat provided on the vehicle body; a pair of right and left entrances through which a user to be seated on the seat gets into and out of the vehicle, the entrances being provided at both sides of the vehicle body in a vehicle width direction; and a pair of right and left doors for opening and closing the pair of right and left entrances, respectively; each of the pair of right and left doors including a door body closing at least a portion of a corresponding entrance and a hinge for coupling the door body to the vehicle body such that the door body is rotatable around the hinge; and the door body including a door component which is substantially symmetric in shape in a rightward and leftward direction.

6 Claims, 12 Drawing Sheets

UTILITY VEHICLE

BACKGROUND OF THE INVENTION

1. Field of the Invention

The present invention relates to a utility vehicle including doors for opening and closing entrances.

2. Description of the Related Art

An exemplary utility vehicle including doors for opening and closing entrances is disclosed in Japanese Laid-Open Patent Application Publication No. 2009-243189. In this utility vehicle, since a planar shape of the door inside the vehicle is different from a planar shape of the door outside the vehicle, the door is entirely unsymmetric in a rightward and leftward direction. For this reason, it is necessary to manufacture a left door for opening and closing a left entrance and a right door for opening and closing a right entrance using separate dies. This results in a low manufacturing efficiency of the utility vehicle and a high cost. In addition, since two kinds of doors, which are the left door and the right door, must be prepared, management of components is burdensome.

SUMMARY OF THE INVENTION

An object of the present invention is to reduce the kind of components of a utility vehicle and improve a manufacturing efficiency of the utility vehicle.

A utility vehicle of the present invention comprises a vehicle body; a seat provided on the vehicle body; a pair of right and left entrances through which a user to be seated on the seat gets into and out of the vehicle, the entrances being provided at both sides of the vehicle body in a vehicle width direction; and a pair of right and left doors for opening and closing the pair of right and left entrances, respectively; each of the pair of right and left doors including a door body closing at least a portion of a corresponding entrance and a hinge for coupling the door body to the vehicle body such that the door body is rotatable around the hinge; and the door body including a door component which is substantially symmetric in shape in a rightward and leftward direction.

In such a configuration, since the door component constituting the door is substantially symmetric in shape in the rightward and leftward direction, the door component of the same kind can be used for both of the right and left doors. Therefore, the kind of components can be reduced and a manufacturing efficiency can be improved.

A door component of the present invention is a door component constituting one of a pair of right and left doors for opening and closing a pair of right and left entrances of a utility vehicle, respectively, the door component being substantially symmetric in shape in a rightward and left direction.

The above object, other objects, features, and advantages of the present invention will be apparent by the following detailed description of preferred embodiment of the inventions, with reference to the accompanying drawings.

DETAILED DESCRIPTION OF THE PREFERRED EMBODIMENTS

Hereinafter, embodiments of the present invention will be described with reference to the drawings. The stated directions are referenced from the perspective of a driver riding in a utility vehicle. It is assumed that the utility vehicle is in a stopped state on a road surface substantially parallel to a horizontal plane.

Figure 1:
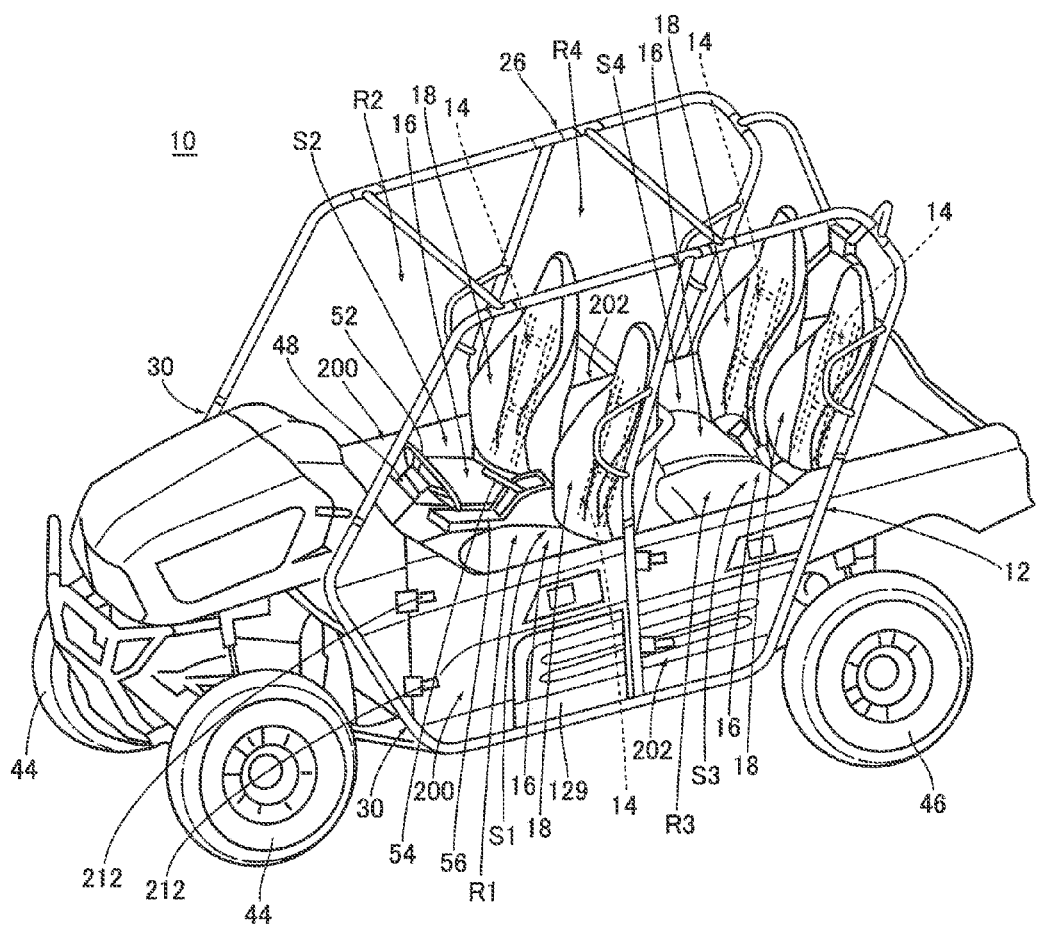
FIG. 1 is a perspective view showing an external appearance of a utility vehicle according to Embodiment 1.
Figure 2:
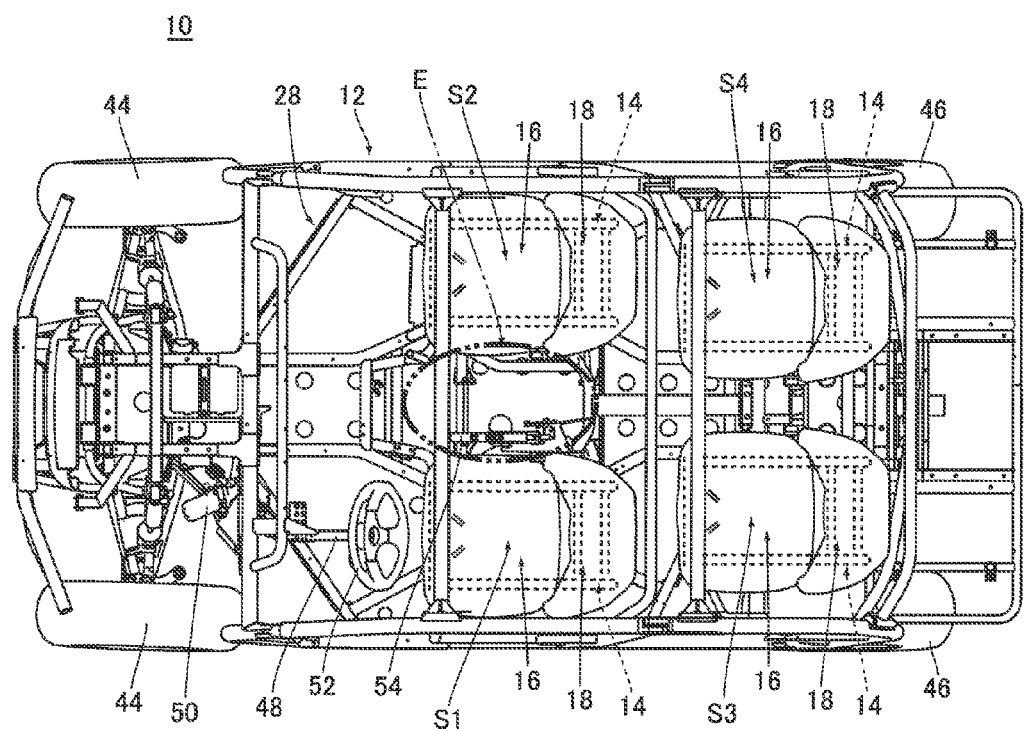
FIG. 2 is a plan view showing a configuration of the utility vehicle according to Embodiment 1.
Figure 3:
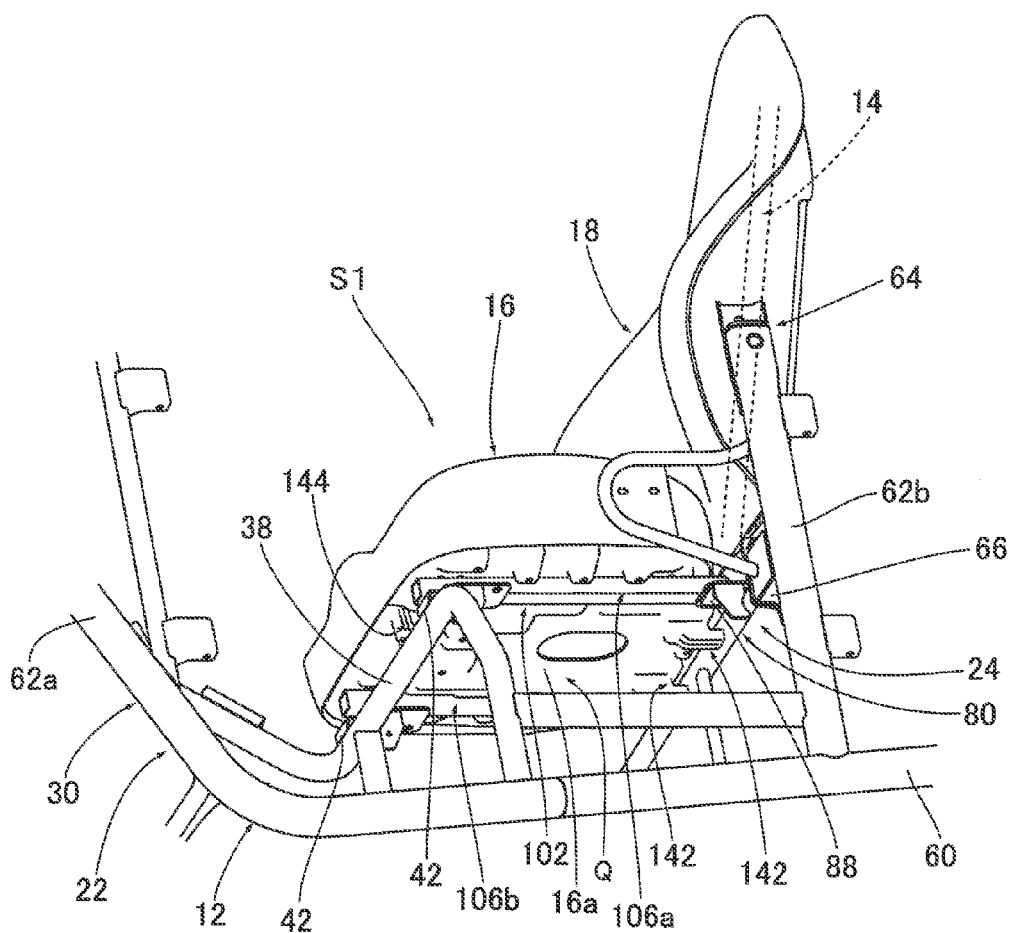
FIG. 3 is a perspective view showing a state where a seat is mounted to a vehicle body as viewed from obliquely downward.

FIG. 1 is a perspective view showing an external appearance of a utility vehicle 10 according to Embodiment 1. FIG. 2 is a plan view showing a configuration of the utility vehicle 10 according to Embodiment 1. FIG. 3 is a perspective view showing a state where a seat 51 is mounted to a vehicle body 12 as viewed from obliquely downward.

Referring to FIGS. 1 to 3, the utility vehicle 10 includes a vehicle body 12, four seat frames 14 mounted to the vehicle body 12, seat bottoms 16 mounted to the four seat frames 14, respectively, and seat backrests 18 mounted to the four seat frames 14, respectively. As shown in FIGS. 1 and 2, each of the four independent seats S1~S4 on which a user is seated includes the seat frame 14, the seat bottom 16 and the seat backrest 18. In this embodiment, the seats S1 and S2 at the front side are arranged side by side in a rightward and leftward direction, and the seats S3 and S4 are arranged side by side in the rightward and leftward direction, behind the seats S1 and S2, respectively. The seat S1 located at a front side and at a left side is a driver seat. As shown in FIG. 1, the utility vehicle 10 includes a pair of right and left front doors 200 and a pair of right and left rear doors 202. The pair of right and left front doors 200 is arranged at the front and the pair of right and left rear doors 202 are arranged at the rear.

Figure 4:
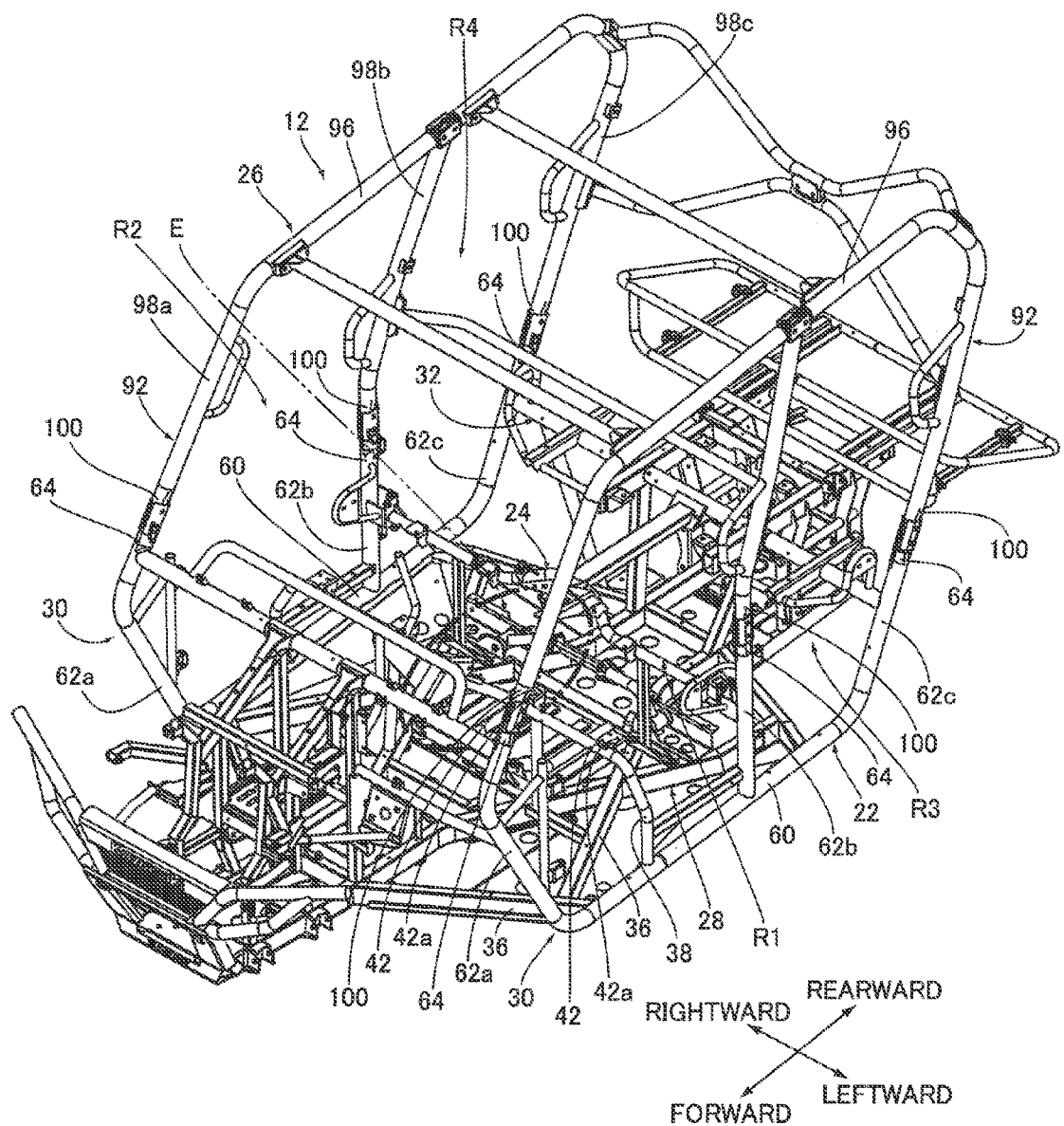
FIG. 4 is a perspective view showing a configuration of a vehicle body.
Figure 5:
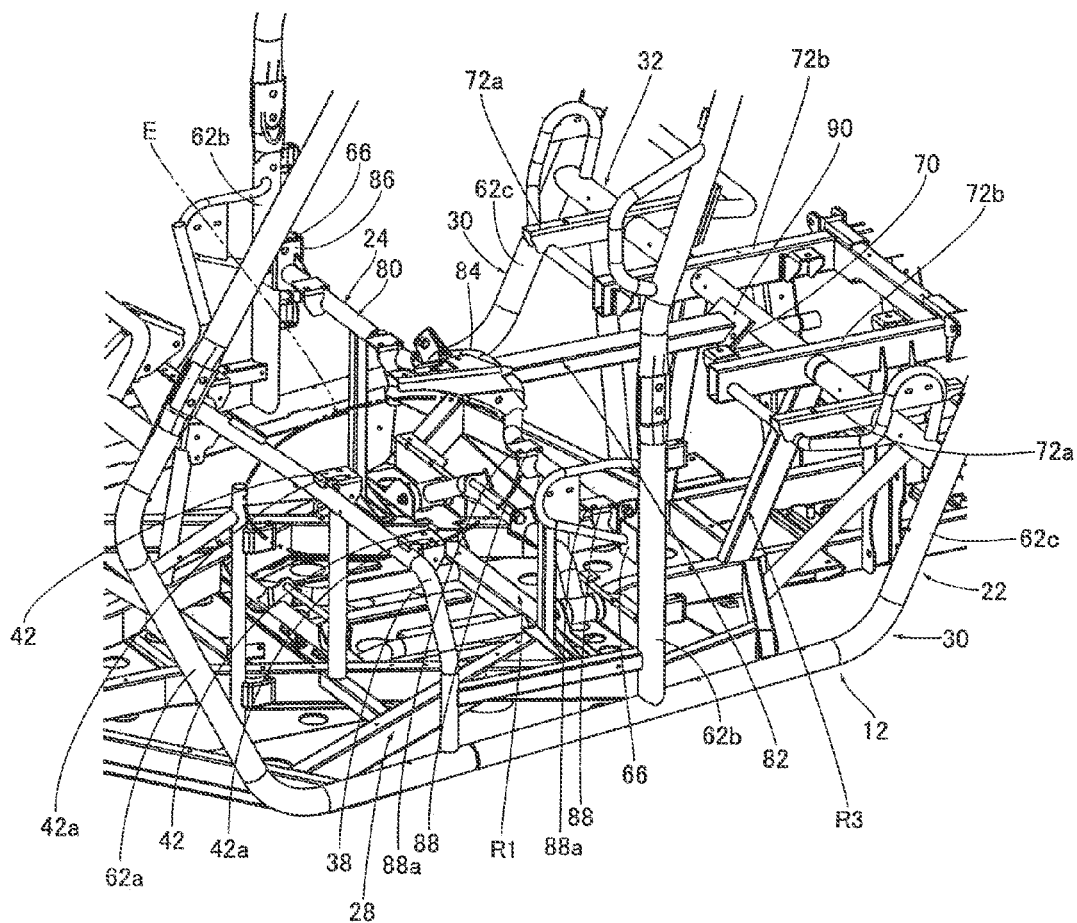
FIG. 5 is a perspective view showing a configuration of a part of the vehicle body.
Figure 6:
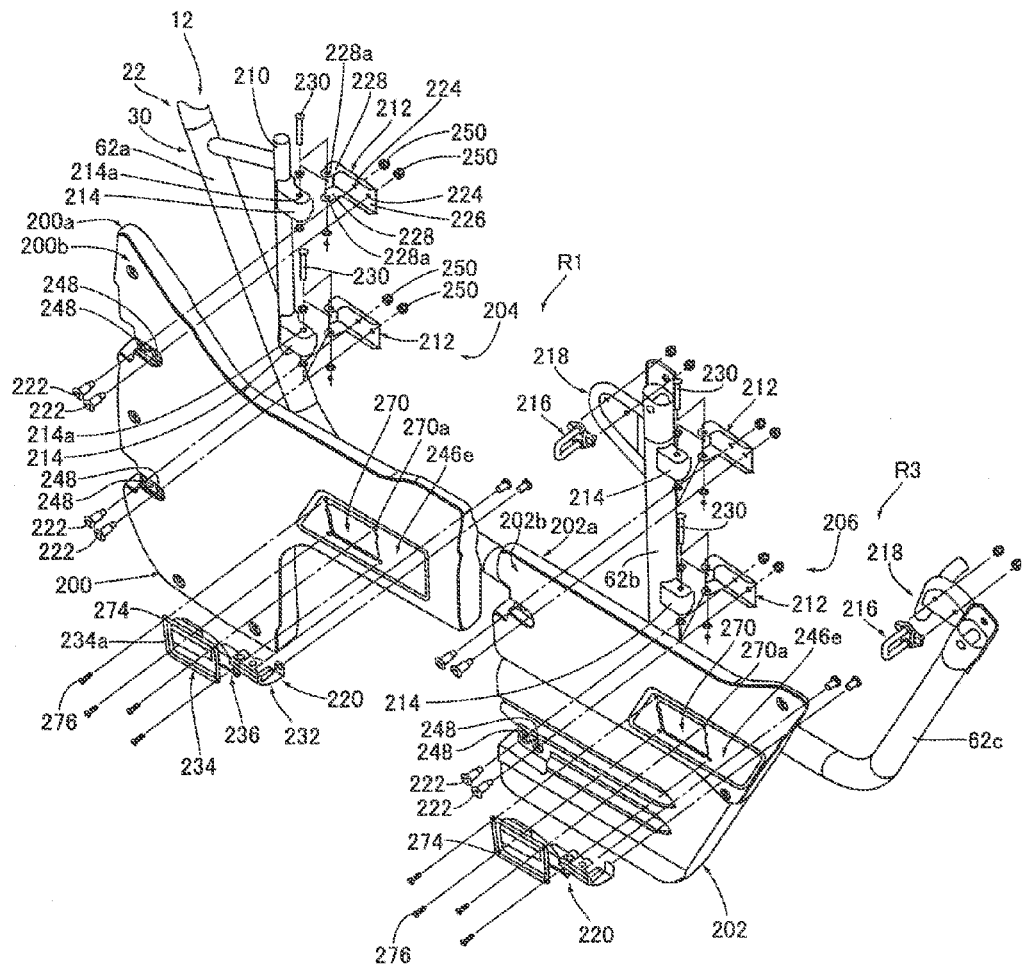
FIG. 6 is a perspective view showing a configuration of a front door, a front door support system, a rear door, and a rear door support system.

FIG. 4 is a perspective view showing a configuration of the vehicle body 12. FIG. 5 is a perspective view showing a configuration of a part of the vehicle body 12. FIG. 6 is a perspective view showing a configuration of the front door 200, a front door support system 204, the rear door 202, and a rear door support system 206. As shown in FIG. 4, the vehicle body 12 includes a main frame 22, a sub-frame 24 for reinforcing the main frame 22, and a cabin frame (ROPS) 26. As shown in FIG. 6, the vehicle body 12 includes two front door support systems 204 for supporting the two front doors 200, respectively and two rear door support systems 206 for supporting the two rear doors 202, respectively.

As shown in FIG. 4, the main frame 22 includes a floor member 28 which is opposite to the road surface, a pair of lower side members 30 provided at both sides of the floor member 28 in a vehicle width direction (i.e., in a rightward and leftward direction, the same occurs), and a cross member 32 coupling the lower side members 30 to each other. As shown in FIG. 2, the floor member 28 is a base member configured to support the engine E and the four seats S1~S4. As shown in FIG. 5, at a portion of an upper surface of the floor member 28, corresponding to a front end portion of each of the seats S1 and S2 (FIG. 2), a substantially arch-shaped support pipe 38 is disposed to extend in the vehicle width direction and configured to support the seat frame 14 (FIG. 2). Each support pipe 38 is provided with two plates 42 arranged to be spaced apart from each other in the vehicle width direction. The plates 42 have holes 42a into which bolts 40 (FIG. 7) are inserted, respectively. Referring to FIG. 2, two front wheels 44 are suspended from the front portion of the floor member 28, two rear wheels 46 are suspended from the rear portion of the floor member 28, and an engine E is mounted at the center portion of the floor member 28. The four seats S1-S4 are arranged on the floor member 28 at right and left sides and at the front and rear sides. A steering shaft 48 is provided forward relative to the seat S1. An electric power steering device 50 is coupled to a lower end portion of the steering shaft 48. A handle 52 is coupled to an upper end portion of the steering shaft 48. A lever 54 of a parking brake is provided at a right side of the seat S1.

As shown in FIG. 1, each lower side member 30 is configured to support the cabin frame (ROPS) 26, the front door 200 and the rear door 202. As shown in FIG. 4, the lower side member 30 includes a side pipe element 60 extending in a forward and rearward direction at a side portion of the floor member 28 in the vehicle width direction, a first lower pillar pipe element 62a extending upward from a front end portion of the side pipe element 60, a second lower pillar pipe element 62b extending upward from a center portion of the side pipe element 60 in the forward and rearward direction, and a third lower pillar pipe element 62c extending upward from a rear end portion of the side pipe element 60. The side pipe element 60 is welded to the square pipe 36 of the floor member 28 at a side portion thereof in the vehicle width direction. As shown in FIG. 3, connecting portions 64 for connecting the cabin frame (ROPS) 26 (FIG. 4) are provided at upper end portions of the lower pillar pipe elements 62a~62c, respectively, and a connecting portion 66 is provided at a vertical center portion of each of the second lower pillar pipe elements 62b to connect the sub-frame 24.

Referring to FIG. 5, the cross member 32 is a pipe member for coupling third lower pillar pipe elements 62c of the pair of right and left lower side members 30. The cross member 32 is provided with a connecting portion 70, at a center portion thereof in a longitudinal direction of the cross member 32. Two support pipes 72a and 72b extending in the forward and rearward direction are provided at portions of the cross member 32 respectively corresponding to the seats S3 and S4 (FIG. 2), to support the seat frame 14 (FIG. 2).

Referring to FIG. 5, the sub-frame 24 includes a pipe-shaped cross member 80 for coupling the second lower pillar pipe elements 62b of the pair of right and left lower side members 30, and a longitudinal member 82 extending in the forward and rearward direction behind the cross member 80. The cross member 80 has a bent portion 84 at a center portion in the longitudinal direction such that the bent portion 84 is bent upward in a rearward direction. Connecting portions 86 are provided at both ends of the cross member 80, respectively, in the longitudinal direction. The connecting portions 86 are coupled to the connecting portions 66 of the main frame 22, respectively, by bolts and other members (not shown). Two plates 88 are welded to portions of the cross member 80 respectively corresponding to rear end portions of the seats S1 and S2 (FIG. 2), respectively such that the two plates 88 are arranged to be spaced apart from each other in the vehicle width direction. The plates 88 have threaded holes 88a into which bolts 40 (FIG. 7) are threadingly engaged. The longitudinal member 82 is a pipe member extending in the forward and rearward direction. A front end portion of the longitudinal member 82 is welded to the bent portion 84, and a connecting portion 90 is provided at a rear end portion of the longitudinal member 82. The connecting portion 90 is connected to the connecting portion 70 of the cross member 32 by bolts and the like which are not shown.

As shown in FIG. 4, the cabin frame (ROPS) 26 includes a pair of right and left upper side members 92 coupled to the pair of right and left lower side members 30, respectively. Each upper side member 92 includes a side pipe element 96 positioned opposite to the side pipe element 60 of the main frame 22, a first upper pillar pipe element 98a extending downward from a front end portion of the side pipe element 96, a second upper pillar pipe element 98b extending downward from a center portion of the side pipe element 96 in the forward and rearward direction, and a third upper pillar pipe element 98c extending downward from a rear end portion of the side pipe element 96. Connecting portions 100 are provided at lower end portions of the upper pillar pipe elements 98a~98c, respectively. The connecting portions 100 are connected to the connecting portions 64 of the lower side members 30, respectively, by bolts and other members which are not shown.

FIG. 6 is a perspective view showing a configuration of the front door 200, the front door support system 204, the rear door 202, and the rear door support system 206. As shown in FIG. 6, the front door support system 204 includes a support rod 210 mounted to a front portion of the lower side member 30 to extend substantially vertically and two mounting portions 214 provided to a side surface of the support rod 210 to be vertically spaced apart from each other. Hinges 212 are mounted to the two mounting portions 214, respectively. The front door support system 204 includes a mounting portion 218 provided to a side surface of the second lower pillar pipe element 62b. A striker member 216 is mounted to the mounting portion 218. As shown in FIG. 6, the rear door support system 206 includes two mounting portions 214 provided to a side surface of the second lower pillar pipe element 62b to be vertically spaced apart from each other. The hinges 212 are mounted to the two mounting portions 214, respectively. The rear door support system 206 includes a mounting portion 218 provided to a side surface of the third lower pillar pipe element 62c. The striker member 216 is mounted to the mounting portion 218.

As shown in FIGS. 1 and 2, each of the seats S1~S4 includes the seat frame 14, the seat bottom 16, and the seat backrest 18. In this embodiment, the seat frames 14 of the left seats S1 and S3 have substantially the same structure, while the seat frames 14 of the right seats S2 and S4 have substantially the same structure. The seat frame 14 of the left seat S1 and the seat frame 14 of the right seat S2 are substantially symmetric in the rightward and leftward direction, while the seat frame 14 of the left seat S3 and the seat frame 14 of the right seat S4 are substantially symmetric in the rightward and leftward direction. The seat bottoms 16 of the seats S1~S4 have substantially the same structure and the seat backrests 18 of the seats S1~S4 have substantially the same structure. The seat frame 14, the seat bottom 16 and the seat backrest 18 of the seat S1 will be described hereinafter, by way of example. Description of the seats S2 and S3 is omitted.

Figure 7:
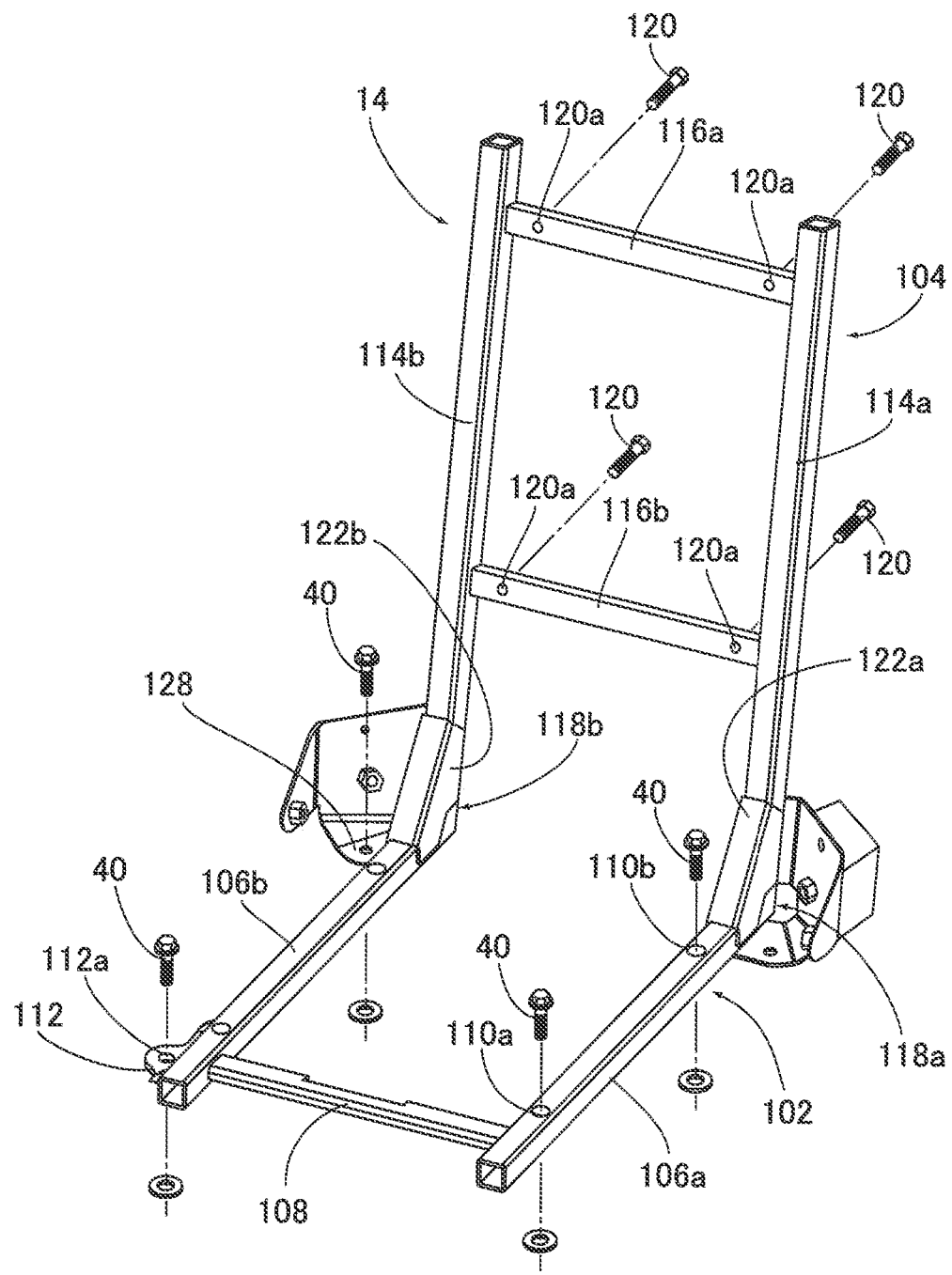
FIG. 7 is a perspective view showing a configuration of a seat frame.

FIG. 7 is a perspective view showing a configuration of the seat frame 14. Referring to FIG. 7, the seat frame 14 includes a seat bottom support member 102 for supporting the seat bottom 16 (FIG. 3) and a seat backrest support member 104 for supporting the seat backrest 18 (FIG. 3). The seat bottom support member 102 includes two support pipes 106a and 106b arranged to extend in the forward and rearward direction substantially in parallel with each other and a coupling pipe 108 for coupling the two support pipes 106a and 106 to each other. The support pipe 106a is provided with holes 110a and 110b which are spaced apart from each other in the forward and rearward direction. Bolts 40 are inserted into the holes 110a and 110b, respectively. A plate 112 is attached to an outer side surface of a front end portion of the support pipe 106b, and has a hole 112a into which the bolt 40 is inserted. As shown in FIG. 7, the seat backrest support member 104 includes two support pipes 114a and 114b arranged to extend substantially vertically and substantially in parallel with each other, and two coupling pipes 116a and 116b for coupling the support pipes 114a and 114b to each other. Each of the two coupling pipes 116a and 116b has holes 120a into which bolts 120 are inserted, respectively.

As shown in FIG. 7, a metal-made reinforcement plate 122a for reinforcing a coupling portion 118a at which the support pipe 114a is coupled to the support pipe 106a, is provided, while a metal-made reinforcement plate 122b for reinforcing a coupling portion 118b at which the support pipe 114b is coupled to the support pipe 106b is mounted. The reinforcement plate 122b is provided with a hole 128 into which the bolt 40 is inserted. As shown in FIG. 3, in a state where when the seat frame 14 is mounted to the vehicle body 12, four bolts 40 are inserted into the holes 110a, 110b, 112a and 128 (FIG. 7) of the seat frame 14 and into the holes 42a, 88a, 42a and 88a (FIG. 5) of the vehicle body 12. By these bolts 40, the seat frame 14 is fastened to the vehicle body 12. As shown in FIG. 3, in a state where the seat frame 14 is fastened to the vehicle body 12, a space Q is formed below the seat frame 14. As shown in FIG. 1, a cover 129 is attached to an opening of the space Q (FIG. 3) formed below each of the front seats S1 and S2.

As shown in FIG. 3, the seat bottom 16 supports a hip part of the user. An upper surface of the seat bottom 16 has a shape in which both side portions in the vehicle width direction are higher than a center portion in the vehicle width direction to allow the user to be easily seated. Two second engagement mechanisms 142 are provided on a rear portion of the lower surface 16a of the seat bottom 16 such that they are spaced apart from each other in the vehicle width direction. The second engagement mechanisms 142 are engaged with the cross member 80 from below. In addition, a first engagement mechanism 144 is provided on a front portion of the lower surface 16a of the seat bottom 16 and is engaged with the coupling pipe 108 (FIG. 7) of the seat frame 14 (FIG. 7) from below. As shown in FIG. 3, when the seat bottom 16 is mounted to the seat frame 14, the second engagement mechanisms 142 are brought into contact with the cross member 80 from forward, and are engaged with the cross member 80. The first engagement mechanism 144 is engaged with the coupling pipe 108 (FIG. 7).

As shown in FIG. 3, the seat backrest 18 supports a back of the user seated on the seat bottom 16. The seat backrest 18 is provided on a back surface thereof with threaded holes (not shown) into which the bolts 120 (FIG. 7) are threadingly engaged. As shown in FIG. 3, when the seat backrest 18 is mounted to the seat frame 14, the bolts 120 are inserted into the plurality of holes 120a provided in the coupling pipes 116a and 116b (FIG. 7) and are threaded into the threaded holes (not shown) of the seat backrest 18.

As shown in FIG. 4, in the vehicle body 12, a space located between the first lower pillar pipe element 62a and the second lower pillar pipe element 62b is continuous with a space located between the first upper pillar pipe element 98a and the second upper pillar pipe element 98b to form each of a pair of right and left entrances R1 and R2, at both sides in the vehicle width direction. Through the entrances R1 and R2, the user can get into and get out of the seats S1 and S2. A space located between the second lower pillar pipe element 62b and the third lower pillar pipe element 62c is continuous with a space located between the second upper pillar pipe element 98b and the third upper pillar pipe element 98c to form each of a pair of left and right entrances R3 and R4, at both sides in the vehicle width direction. Through the entrances R3 and R4, the user can get into and get out of the seats S3 and S4. As shown in FIG. 1, the pair of left and right front doors 200 are mounted to the pair of left and right entrances R1 and R2 by the front door support systems 204, respectively, while the pair of left and right rear doors 202 are mounted to the pair of left and right entrances R3 and R4 by the rear door support systems 206, respectively.

As shown in FIG. 1, the left front door 200 and the right front door 200 are substantially symmetric in the rightward and leftward direction, while the left rear door 202 and the right rear door 202 are substantially symmetric in the rightward and leftward direction. As shown in FIG. 6, the left front door 200 is substantially identical to the left rear door 202 except for a shape difference between the door body 200a and the door body 202a and a shape difference between the decorative cover 200b and the decorative cover 202b. Accordingly, hereinafter, the left front door 200 will be described, and the right front door 200, the left rear door 202 and the right rear door 202 will not be described.

Figure 8:
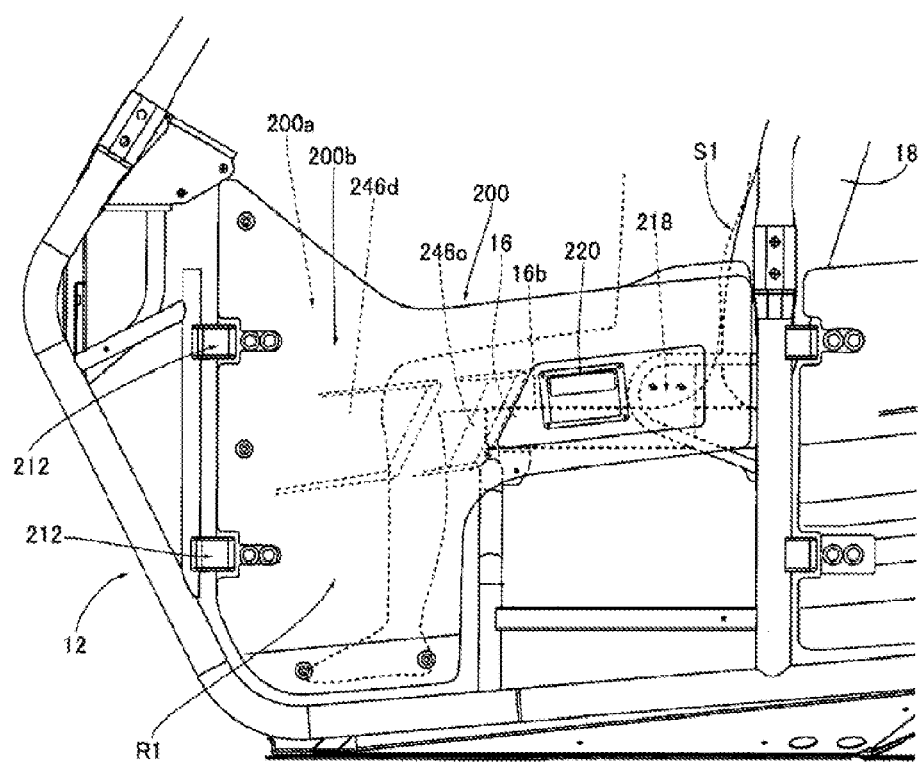
FIG. 8 is a left side view showing a positional relationship between a front door and a seat.
Figure 9:
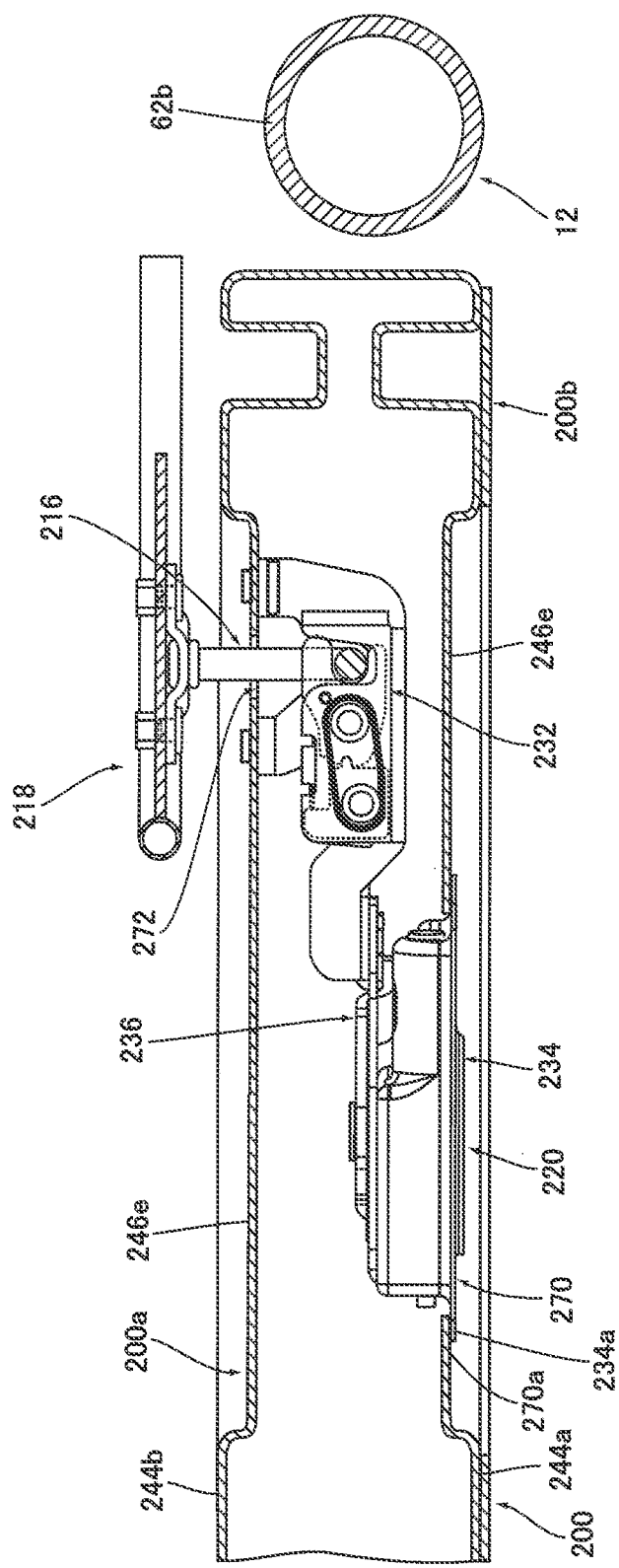
FIG. 9 is an enlarged plan view showing a configuration of a part of the front door.

FIG. 8 is a left side view showing a positional relationship between the front door 200 and the seat S1. FIG. 9 is an enlarged plan view showing a configuration of a part of the front door 200. As shown in FIGS. 6 and 8, the front door 200 includes the door body 200a closing at least a portion of the entrance R1, the decorative cover 200b covering an outer surface of the door body 200a in the vehicle width direction, hinges 212 for coupling the door body 200a to the vehicle body 12 such that the door body 200a is rotatable around the hinges 212, and a latch device 220 for retaining the door body 200a in a state where the door body 200a closes at least a part of the entrance R1.

As shown in FIG. 6, each hinge 212 includes a plate-shaped mounting portion 226 having two holes 224 into which bolts (fastener member) 222 are inserted and a pair of bearings 228 provided integrally with the mounting portion 226. The pair of bearings 228 face each other in a vertical direction. Each of the bearings 228 has a hole 228a into which a pin 230 is inserted.

As shown in FIGS. 6 and 9, the latch device 220 includes a striker member 216 provided at the vehicle body 12 to protrude outward in the vehicle width direction, a latch member 232 provided at the door body 200a such that the latch member 232 is actuated to switch between a first state in which the latch member 232 engages with the striker member 216 and a second state in which the latch member 232 disengages with the striker member 216, an operation member 234 provided at the door body 200a and operated by the user to enter a force for operating the latch member 232, and a force transmission mechanism 236 for transmitting the force input by operation member 234 to the latch member 232.

Figure 10A:
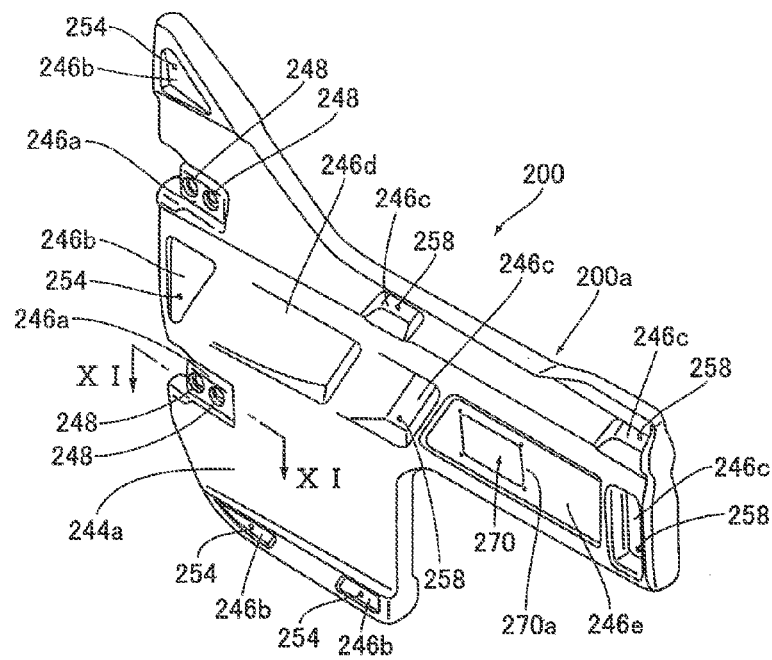
FIG. 10A is a perspective view showing a configuration of a door body of a left front door, when viewed from leftward, rearward, and obliquely above.
Figure 10B:
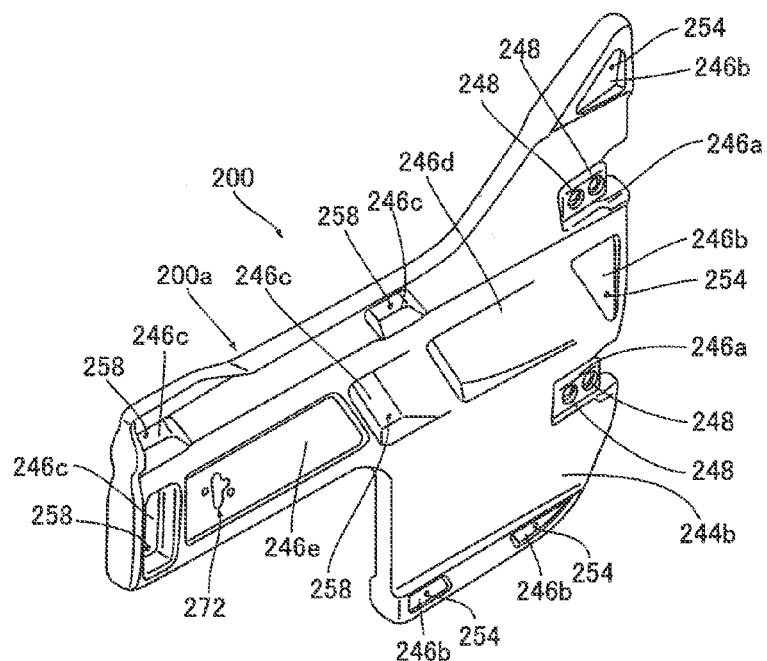
FIG. 10B is a perspective view showing a configuration of a door body of a left front door, when viewed from rightward, rearward, and obliquely above.
Figure 11:
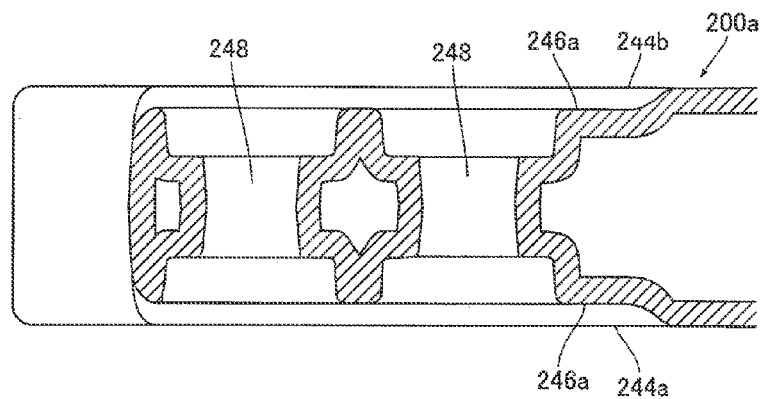
FIG. 11 is a cross-sectional view taken along line XI-XI in FIG. 10A.
Figure 12:
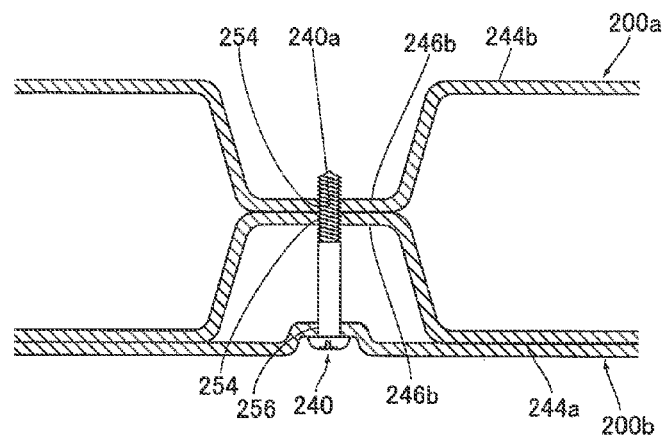
FIG. 12 is a cross-sectional view showing a mounting structure by which a decorative cover is mounted to the door body using a screw (fastener member).
Figure 13:
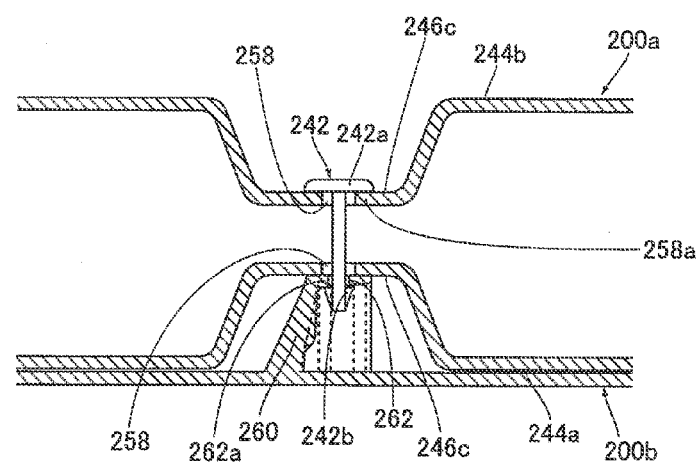
FIG. 13 is a cross-sectional view showing a mounting structure by which the decorative cover is mounted to the door body using a pin (fastener member).
Figure 14:
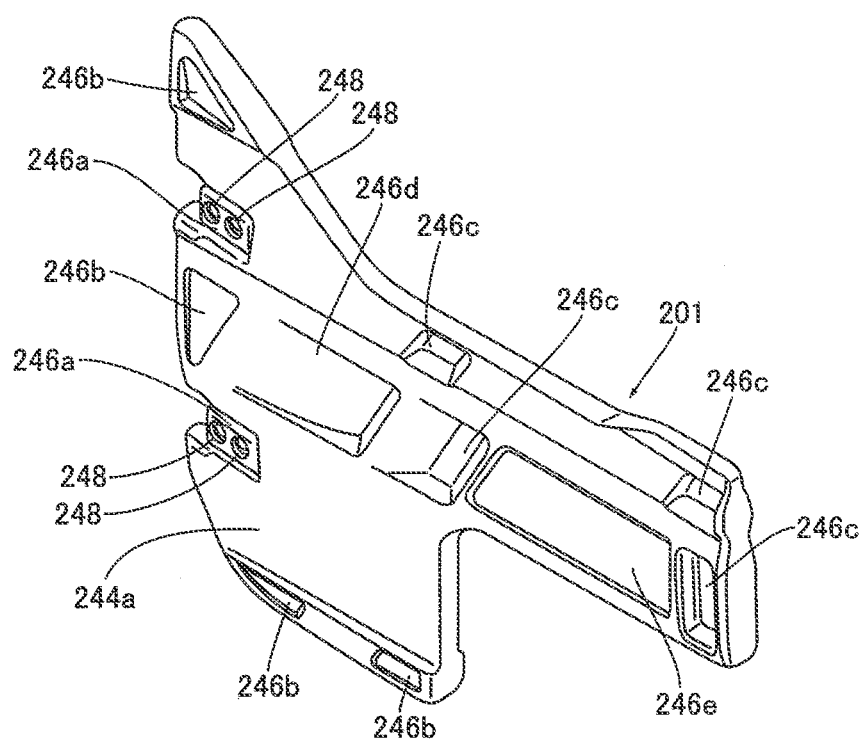
FIG. 14 is a perspective view showing a configuration of a door component for use in the left front door, when viewed from leftward, rearward, and obliquely above.

FIG. 10A is a perspective view showing a configuration of the door body 200a of the left front door 200, when viewed from leftward, rearward, and obliquely above. FIG. 10B is a perspective view showing a configuration of the door body 200a of the left front door 200, when viewed from rightward, rearward, and obliquely above. FIG. 11 is a cross-sectional view taken along line XI-XI in FIG. 10A. FIG. 12 is a cross-sectional view showing a mounting structure by which the decorative cover 200b is mounted to the door body 200a by using a screw (fastener member) 240. FIG. 13 is a cross-sectional view showing a mounting structure by which the decorative cover 200b is mounted to the door body 200a by using a pin (fastener member) 242. FIG. 14 is a perspective view showing a configuration of a door component 201 for use in the left front door 200, when viewed from leftward, rearward, and obliquely above.

As shown in FIG. 9, the door body 200a of the front door 200 is configured to include the door component 201 (FIG. 14) which is substantially symmetric in shape in the rightward and leftward direction. As shown in FIG. 14, the door component 201 has a hollow shape formed using resin by blow molding such that the door component 201 is substantially symmetric in shape in the rightward and leftward direction. The door component 201 of the same kind is used for both of the door body 200a of the left front door 200 and the door body 200a (not shown) of the right front door 200 (FIG. 1).

As shown in FIGS. 10A and 10B, the door body 200a has a plurality of (in this embodiment, in total twelve) recesses 246a~246e provided on each of an outer surface 244a (FIG. 10A) in the vehicle width direction and an inner surface 244b (FIG. 10B) in the vehicle width direction. The recesses 246a~246e provided on the outer surface 244a (FIG. 10A) face the recesses 246a~246e provided on the inner surface 244b (FIG. 10B), and these recesses 246a~246e can partially enhance a stiffness of the door body 200a. As shown in FIG. 1, in this embodiment, the cover 129 is attached to the opening of the space Q (FIG. 3) formed below each of the front seats S1 and S2. As shown in FIGS. 10A and 10B, a portion of the door body 200a, corresponding to the cover 129 (FIG. 1) is cut.

As shown in FIGS. 10A and 10B, the two first recesses 246a provided at a front portion of each of the outer surface 244a (FIG. 10A) and the inner surface 244b (FIG. 10B) of the door body 200a are portions to which the hinges 212 (FIG. 6) are mounted. As shown in FIG. 11, holes 248 into which bolts (fastener members) 222 (FIG. 6) for fastening the door body 200a to the hinge 212 (FIG. 6) are inserted are formed on each of the pair of first recesses 246a facing each other in the vehicle width direction such that the holes 248 communicate with each other. As shown in FIG. 6, when the hinge 212 is mounted to the door body 200a, the bolts (fastener members) 222 are inserted into the holes 248 of the door body 200a and into the holes 224 of the hinges 212 and nuts 250 are threadingly engaged with the bolts (fastener members) 222, respectively. When the hinge 212 is mounted to the vehicle body 12, the pair of bearings 228 are positioned vertically at both sides of the mounting portion 214, and the pin 230 is inserted into the holes 228a of the bearings 228 and into the hole 214a of the mounting portion 214.

As shown in FIGS. 10A and 10B, the four second recesses 246b provided at a front portion and a lower portion of each of the outer surface 244a (FIG. 10A) and the inner surface 244b (FIG. 10B) of the door body 200a are portions to which the front portion and lower portion of the decorative cover 200b (FIG. 6, FIG. 8) are mounted, respectively. As shown in FIG. 12, the pair of second recesses 246b facing each other in the vehicle width direction have holes 254 into which a screw (fastener member) 240 for fastening the decorative cover 200b to the door body 200a is inserted such that the holes 254 communicate with each other. As shown in FIG. 12, when the decorative cover 200b is mounted to the door body 200a, the screw (fastener member) 240 is inserted into a hole 256 formed on the decorative cover 200b. A male thread 240a formed on an outer surface of the screw (fastener member) 240 is threaded into the holes 254 formed on the second recesses 246b of the door body 200a.

As shown in FIGS. 10A and 10B, the four third recesses 246c provided at a rear portion and a center portion in the forward and rearward direction in each of the outer surface 244a (FIG. 10A) and the inner surface 244b (FIG. 10B) of the door body 200a are portions to which the rear portion and center portion in the forward and rearward direction of the decorative cover 200b (FIG. 6, FIG. 8) are mounted, respectively. As shown in FIG. 13, holes 258 into which the pin 242 (fastener member) for fastening the decorative cover 200b to the door body 200a is inserted are formed on the pair of third recesses 246c facing each other in the vehicle width direction such that the holes 258 communicate with each other. An engagement portion 260 is formed in a portion of the decorative cover 200b (FIG. 6, FIG. 8) which faces the third recess 246c, to protrude into an inner space of the third recess 246c, and a hole 262 is formed on a tip end portion of the engagement portion 260 to communicate with the hole 258 formed on the third recess 246c. As shown in FIG. 13, when the decorative cover 200b is mounted to the door body 200a, the pin (fastener member) 242 is inserted into the holes 258 of the door body 200a and into the hole 262 of the decorative cover 200b. A head portion 242a formed at a base end portion of the pin (fastener member) 242 is engaged with an inner peripheral portion 258a of the hole 258 in the inner surface 244b of the door body 200a, and a protrusion 242b formed at a tip end portion of the pin (fastener member) 242 is engaged with an inner peripheral portion 262a of the hole 262.

As shown in FIGS. 10A and 10B, the fourth recesses 246d which are provided at front portions in vertical center portions of the outer surface 244a (FIG. 10A) and the inner surface 244b (FIG. 10B) of the door body 200a and the third recesses 246c positioned behind the fourth recesses 246d are portions which the user's knee contacts. As shown in FIG. 8, at least portions of the fourth recesses 246d and the third recesses 246c are positioned forward relative to the seat bottom 16 of the seat S1 and above the upper surface 16b of the seat bottom 16 to correspond to a location of the knee of the user seated on the seat 51 when viewed from the side.

As shown in FIGS. 10A and 10B, the fifth recesses 246e formed at a rear portion of the outer surface 244a (FIG. 10A) and at a rear portion of the inner surface 244b (FIG. 10B) of the door body 200a are portions to which the latch device 220 (FIG. 6) is mounted. As shown in FIG. 10A, the door body 200a has, on the fifth recess 246e of the outer surface 244a in the vehicle width direction, a mounting hole 270 to which the operation member 234 (FIG. 6) of the latch device 220 is mounted. As shown in FIG. 10B, the door body 200a has, on the fifth recess 246e of the inner surface 244b in the vehicle width direction, a hole 272 for receiving the striker member 216 of the latch device 220. As shown in FIG. 6, when the operation member 234 of the latch device 220 is mounted to the mounting hole 270, a flange 234a formed on the operation member 234 is brought into contact with an inner peripheral portion 270a of the mounting hole 270. Screws 276 are inserted into a plurality of holes 274 formed in the flange 234a, respectively, and are threaded into the inner peripheral portion 270a of the mounting hole 270.

The mounting hole 270 and the hole 272 are formed by secondarily processing the door component 201 (FIG. 14). As shown in FIG. 14, the door component 201 has a hollow shape formed using resin by blow molding in a state where the door component 201 is not provided with the mounting hole 270 and the hole 272 yet. Depending on whether the door component 201 is used for the left front door 200 or the right front door 200, a surface on which the mounting hole 270 and the hole 272 are to be formed, is determined.

As shown in FIG. 1, in this embodiment, the door component 201 (FIG. 14) constituting the door 200 is substantially symmetric in shape in the rightward and leftward direction. Therefore, the door component 201 (FIG. 14) of the same kind can be used for both the left door 200 and the right door 202. This reduces the kind of the components and improves a manufacturing efficiency.

As shown in FIGS. 10A and 10B, in this embodiment, the portions of the door body 200a, to which the decorative cover 200b, the hinges 212 and the latch device 220 are mounted, are reinforced by the recesses 246a~246e. This makes it possible to firmly fasten the door body 200a to the decorative cover 200b, the hinges 212 and the latch device 220.

As shown in FIG. 8, in this embodiment, since at least portions of the fourth recesses 246d and the third recesses 246c are positioned forward relative to the seat bottom 16 of the seat S1 and above the upper surface 16b of the seat bottom 16, the user's knee can be disposed in at least portions of the fourth recesses 246d and the third recesses 246c. As a result, a substantially wide space can be ensured for the seat S1, and comfortableness of the seat S1 can be improved.

Although in this embodiment, the screw 240 (FIG. 12) and the pin 242 (FIG. 13) are used as fastener members for fastening the door body 200a to the decorative cover 200b, other fastener members such as pin and bolt may be used instead of the screw 240 (FIG. 12), and other fastener members such as screw and bolt may be used instead of pin 242 (FIG. 13). The door component 201 (FIG. 14) constituting the door body 200a may be formed of metal such as aluminum, instead of resin. Although the four seats S1~S4 are arranged at the front and rear sides and at the right and left sides in the above embodiment as shown in FIG. 1, the number and arrangement of the seats may be suitably changed as desired. For example, only the seats S1 and S2 may be arranged side by side at the right and left sides, or otherwise only the seats S1 and S3 may be arranged at the front and rear sides in a two-seated utility vehicle.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
a vehicle body;
a seat provided on the vehicle body;
a pair of right and left entrances through which a user to be seated on the seat gets into and out of the vehicle, the entrances being provided at both sides of the vehicle body in a vehicle width direction; and
a pair of right and left doors for opening and closing the pair of right and left entrances, respectively;
each of the pair of right and left doors including a door body closing at least a portion of a corresponding entrance, a hinge for coupling the door body to the vehicle body such that the door body is rotatable around the hinge, and a latch device having an operation member for opening and closing the door;
the door body including a door component which is substantially symmetric in shape in a rightward and leftward direction and having a mounting hole to which the operation member is mounted; and
the mounting hole being a hole formed from the door component wherein the door component has a hollowed shape formed using resin by blow molding.

2. The utility vehicle according to claim 1,
wherein a pair of right and left front doors are arranged side by side at a front and a pair of right and left rear doors are arranged side by side at a rear;
the door body constituting each of the pair of right and left front doors including a door component which is substantially symmetric in shape in the rightward and leftward direction; and
the door body constituting each of the pair of right and left rear doors including a door component which is substantially symmetric in shape in the rightward and leftward direction.

3. The utility vehicle according to claim 1, wherein at least one of the doors includes a decorative cover mounted to an outer surface of the door body in the vehicle width direction.

4. The utility vehicle according to claim 3, wherein the door body includes a plurality of recesses on an outer surface and an inner surface in the vehicle width direction; and
a pair of recesses among the plurality of recesses, the pair of recesses facing each other in the vehicle width direction and having respective holes into which fastener members for fastening the decorative cover and the door body together are inserted, the holes communicating with each other.

5. The utility vehicle according to claim 1,
wherein the door body includes recesses on an outer surface and an inner surface in the vehicle width direction; and
at least portions of the recesses are positioned forward relative to a seat bottom of the seat and above an upper surface of the seat bottom of the seat to correspond to a knee of the user seated on the seat when viewed from a side.

6. The utility vehicle according to claim 1, wherein the door body includes a plurality of recesses on an outer surface and an inner surface in the vehicle width direction; and
a pair of recesses among the plurality of recesses, which face each other in the vehicle width direction, have respective holes into which fastener members for fastening the door body and the hinge together are inserted, the holes communicating with each other.

* * * * *